United States Patent Office 2,897,239
Patented July 28, 1959

2,897,239

PROCESS FOR THE PRODUCTION OF CUMENE HYDRO-PEROXIDE

Nino Rovelli, Milan, Italy, assignor to Società Italiana Resine, Milan, Italy

No Drawing. Application May 20, 1958
Serial No. 736,470

Claims priority, application Italy May 27, 1957

9 Claims. (Cl. 260—610)

It is known that cumene or isopropylbenzene has the property of self-oxidizing to cumene hydro-peroxide, more particularly when irradiated by ultraviolet rays (Hock and Lang—Berichte 77, page 254 (1944)). Since cumene hydro-peroxide may yield, by acid hydrolysis, phenol and acetone, a plurality of processes have been developed for economically and industrially preparing cumene hydro-peroxide with a view to commercially manufacturing phenol and acetone. Methods at present universally employed are based on oxidation of cumene with air at atmospheric pressure and/or overpressure of about 8–15 kg./cm.$^2$ at temperature of about 90° C. to about 120° C.

Oxidation is carried out without any usual oxidation catalysts but in the presence of alkaline hydroxides or an alkaline salt of organic acids.

The ultimate reaction liquid contains in addition to cumene hydro-proxide (about 25–30%) and cumene a certain amount of dimethyl-phenylcarbinol, a by-product formed in the oxidation of a cumene molecule by one hydro-peroxide molecule which is likewise automatically reduced to dimethyl-phenylcarbinol.

On the subsequent acid hydrolysis reaction and fractional distillation for recovery of phenol and acetone the dimethyl-phenylcarbinol is dehydrated to alpha-methylstyrene which is recovered together with unreacted cumene.

With catalysts employed heretofore, alpha-methyl-styrene cannot be recycled with recovered cumene, for it would act objectionably under various aspects, which would considerably lower the cumene hydro-peroxide yield.

Owing to the low concentration of alpha-methylstyrene, which amounts to about 1%, expensive lengthy fractional distillations are therefore necessarily resorted to in order to separate alpha-methylstyrene from the recycled cumene; the cumene-alpha-methylstyrene mixture is also submitted to an expensive hydrogenation under pressure in the presence of a nickel base catalyst in order to reconvert alpha-methylstyrene to cumene.

Applicants have now discovered a new oxidation procedure with molecular oxygen containing gases, such as air through which the cumene-alpha-methylstyrene mixture can be recycled till an alpha-methylstyrene concentration in recycled cumene of over 20% by weight is reached without any difficulty or decrease in yield.

The important advantage of the new procedure will be readily appreciated. With a larger alpha-methyl-styrene concentration the rectification or hydrogenation steps are largely facilitated, the plant size being reduced down to at least one fifth. This results in a considerable saving in work, raw materials and investments.

The new process is substantially based on the use of calcium carbonate as a neutralizing agent for the small quantities of acid products formed as oxidation proceeds, in the presence of a certain water quantity.

The amounts of calcium carbonate are widely variable from a minimum of 0.1% by weight with respect to the reaction mass up to a maximum consistent with a satisfactory technological plant operation. However, it was ascertained that best efficiencies are obtained by employing about 2% by weight of calcium carbonate. The water percentage too is variable within wide limits, ranging from a minimum quantity of 0.01% up to a maximum proportion of 50 to 60% and more.

However, best efficiencies were obtained by using water percentages ranging between 1% and 10% to the reaction mass, the proportion varying depending upon the reaction temperature, the water percentage increasing with the increase of temperature.

The use of calcium carbonate as a neutralizing agent affords a further economical advantage, in that calcium carbonate cannot form salts of cumene hydro-peroxide as are formed by hydroxides or salts of alkaline metals. This avoids any loss of cumene hydro-peroxides in salts form. On account of the large quantities involved in large industrial plants, a considerable saving in starting cumene is effected.

The following example will further illustrate the invention, though they should not be understood as limitations thereof.

Example 1

A stainless steel V$_2$A autoclave having a useful content of 120 liters provided with a stirrer of the "Turbomixer" type, reflux cooler, thermometer and a heating coil with a by-pass for the cooling water is filled with 78 kgs. cumene containing about 6% cumene hydroperoxide acting as a promoter, 20 kgs. alpha-methylstyrene, 2 kgs. precipitated calcium carbonate and 2 kgs. H$_2$O. The mixture is heated to about 95° C. while thoroughly stirring. As the desired temperature is reached, the flow of a previously filtered molecular oxygen containing gas, such as air, is started with an amount exceeding by about 50% the theoretical quantity.

In order to maintain the initial water percentage constant, hourly about 0.1 kg. water is injected in a continuous stream beginning as air-flow is started. After about 24 hours, a mixture results which contains about 27% cumene hydro-peroxide and less than 1% dimethyl-phenylcarbinol.

A comparative test carried out on the same starting mixture employing 2% sodium hydroxide led to a final mixture containing 24% only of hydro-peroxide, over 1.5% dimethyl-phenylcarbinol and a residue comprising low polymers of alpha-methylstyrene by about 5%.

Example 2

The same autoclave as in Example 1 filled with a mixture of 70 kgs. cumene containing about 6% cumene hydro-peroxide, 20 kgs. alpha-methylstyrene, 2 kgs. calcium carbonate and 8 kgs. H$_2$O. The mass is heated to about 115° C. whereupon bubbling of air at a pressure of about 7 kgs./cm.$^2$ is started.

The air quantity is adjusted so that on issue the air still contains an oxygen residue not exceeding 8% and not lower than 5%.

The water percentage is maintained constant by injecting about 0.05 kg. H$_2$O per hour.

After four hours, the cumene hydro-peroxide content reaches about 29% with less than 1% dimethyl-phenylcarbinol and no by-products.

A comparative test employing sodium hydroxide instead of calcium hydroxide yielded over 2% dimethyl-phenylcarbinol and about 7% low polymers of alpha-methylstyrene which could not be recovered.

It will be obvious to the experts in the branch that, by adopting conventional measures, the method as described and claimed can be carried out continuously. The capacity of the plant will determine whether the operation should preferably be continuous or discontinuous.

What I claim is:

1. The process of manufacture of cumene-hydroperoxide from cumene mixtures containing at least over 20% by weight of alpha-methylstyrene which comprises adding to the mixture an amount in the range of 0.1 to 2.0 weight percent of calcium carbonate and water, bringing the mixture at a temperature from about 85° C. to about 115° C. into intimate contact with molecular oxygen containing gases while water content of the reaction mixture is maintained constant by continuously adding therein the required amounts of water.

2. The process of claim 1, wherein water content of the reaction mixture is 0.01% by weight at a reaction temperature of 85° C. and 15% by weight at 115° C.

3. The process of claim 2, wherein the reaction is carried out at atmospheric pressure.

4. The process of claim 2, wherein the reaction is carried out at superatmospheric pressure.

5. The process of manufacture of cumene hydroperoxide from cumene mixtures containing at least over 20% by weight of alpha-methylstyrene which comprises adding to the mixture an amount in the range of 0.1 to 2.0 weight percent of calcium carbonate and water to an extent from 0.01% to about 15%, bringing the mixture at a temperature from about 85° C. to about 115° C. into intimate contact with molecular oxygen while the reaction mixture water content is maintained constant by continuously adding therein the required amount of water.

6. The process of claim 5, wherein the reaction is carried out continuously.

7. The process of claim 6, wherein the reaction is initially promoted by the addition of cumene hydroperoxide to the reaction mixture.

8. The process of claim 5, wherein the reaction is carried out discontinuously.

9. The process of claim 8, wherein the reaction is initially promoted by the addition of cumene hydroperoxide to the reaction mixture.

References Cited in the file of this patent

UNITED STATES PATENTS 2,613,227   Joris _____ Oct. 7, 1952